US008918499B2

(12) United States Patent
Beaty et al.

(10) Patent No.: US 8,918,499 B2
(45) Date of Patent: Dec. 23, 2014

(54) METHOD AND SYSTEM FOR END-TO-END QUALITY OF SERVICE IN VIRTUALIZED DESKTOP SYSTEMS

(75) Inventors: Kirk A. Beaty, Goldens Bridge, NY (US); Andrzej Kochut, Elmsford, NY (US); Sambit Sahu, Hopewell Junction, NY (US); Charles O. Schulz, Ridgefield, CT (US); Hidayatullah H. Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/853,017

(22) Filed: Aug. 9, 2010

(65) Prior Publication Data

US 2012/0036251 A1 Feb. 9, 2012

(51) Int. Cl.
*G06F 15/16* (2006.01)
*G06F 15/173* (2006.01)
*H04L 29/08* (2006.01)
*H04L 12/26* (2006.01)
*G06F 9/455* (2006.01)

(52) U.S. Cl.
CPC .............. *H04L 67/08* (2013.01); *H04L 43/08* (2013.01); *G06F 9/45558* (2013.01); *G06F 2009/45595* (2013.01); *G06F 2009/4557* (2013.01)
USPC ............................. 709/224; 709/219; 709/226

(58) Field of Classification Search
USPC ......................................................... 709/224
See application file for complete search history.

(56) References Cited

U.S. PATENT DOCUMENTS

| | | | |
|---|---|---|---|
| 5,987,256 A * | 11/1999 | Wu et al. ........................ | 717/146 |
| 7,831,661 B2 * | 11/2010 | Makhija et al. ............... | 709/203 |
| 7,865,908 B2 * | 1/2011 | Garg et al. .................... | 719/321 |
| 7,870,153 B2 * | 1/2011 | Croft et al. .................... | 707/781 |
| 7,870,256 B2 * | 1/2011 | Talwar et al. ................. | 709/226 |
| 7,970,966 B1 * | 6/2011 | Hobbs ............................ | 710/72 |
| 8,010,701 B2 * | 8/2011 | Wilkinson et al. ............ | 709/245 |
| 8,015,563 B2 * | 9/2011 | Araujo et al. ..................... | 718/1 |
| 8,028,040 B1 * | 9/2011 | Hobbs et al. .................. | 709/219 |
| 8,051,180 B2 * | 11/2011 | Mazzaferri et al. ........... | 709/227 |
| 8,065,676 B1 * | 11/2011 | Sahai et al. ........................ | 718/1 |
| 8,090,452 B2 * | 1/2012 | Johnson et al. ................. | 700/17 |
| 8,090,797 B2 * | 1/2012 | Chinta et al. ................. | 709/217 |
| 8,127,292 B1 * | 2/2012 | Dobrovolskiy et al. .......... | 718/1 |
| 8,141,090 B1 * | 3/2012 | Graupner et al. ............. | 718/104 |
| 8,150,971 B2 * | 4/2012 | Lublin et al. .................. | 709/226 |

(Continued)

OTHER PUBLICATIONS

Adhikari, S. et al. "mmGrid: Distributed Resource Management Infrastructure for Multimedia Applications," Intl. Proceedings of Parallel and Distributed Processing Symposium, Apr. 26, 2003, pp. 1-8.*

(Continued)

*Primary Examiner* — Melvin H Pollack
(74) *Attorney, Agent, or Firm* — Tutunjian & Bitetto, P.C.; Louis J. Percello (57) ABSTRACT

A system and method is provided for integrating the front-end and back-end of a virtualized desktop environment to achieve an objective. Network measurements are gathered which are related to enforcement of an objective. Based on gathered network measurements and quality of service requirements for user sessions, a determination is made as to how back-resources and front-end remoting protocol settings are to be adjusted. The back-end resources and the front-end remoting protocol settings are controlled to achieve the objective.

24 Claims, 3 Drawing Sheets

(56) References Cited

U.S. PATENT DOCUMENTS

| | | | |
|---|---|---|---|
| 8,161,475 B2* | 4/2012 | Araujo et al. | 718/1 |
| 8,171,385 B1* | 5/2012 | Tormasov | 714/805 |
| 8,176,486 B2* | 5/2012 | Amir Husain | 718/1 |
| 8,194,657 B2* | 6/2012 | Xiong et al. | 370/389 |
| 8,200,796 B1* | 6/2012 | Margulis | 709/223 |
| 8,209,272 B2* | 6/2012 | Little | 706/19 |
| 8,209,674 B2* | 6/2012 | Meijer et al. | 717/151 |
| 8,219,653 B1* | 7/2012 | Keagy et al. | 709/222 |
| 8,219,669 B2* | 7/2012 | Agrusa et al. | 709/224 |
| 8,219,697 B2* | 7/2012 | Langen et al. | 709/230 |
| 8,230,054 B2* | 7/2012 | Mutnuru et al. | 709/223 |
| 8,239,538 B2* | 8/2012 | Zhang et al. | 709/226 |
| 2002/0026474 A1* | 2/2002 | Wang et al. | 709/203 |
| 2010/0325261 A1* | 12/2010 | Radhakrishnan et al. | 709/224 |
| 2010/0332617 A1* | 12/2010 | Goodwin et al. | 709/219 |
| 2011/0004574 A1* | 1/2011 | Jeong et al. | 706/12 |
| 2011/0004676 A1* | 1/2011 | Kawato | 709/221 |
| 2011/0126198 A1* | 5/2011 | Vilke et al. | 718/1 |
| 2011/0179106 A1* | 7/2011 | Hulse et al. | 709/203 |
| 2011/0185355 A1* | 7/2011 | Chawla et al. | 718/1 |
| 2011/0196968 A1* | 8/2011 | Kobayashi et al. | 709/226 |
| 2011/0219112 A1* | 9/2011 | Fagg et al. | 709/224 |
| 2011/0258082 A1* | 10/2011 | Schmieder et al. | 705/27.1 |
| 2012/0102209 A1* | 4/2012 | Fok Ah Chuen et al. | 709/228 |
| 2012/0110131 A1* | 5/2012 | Villagas Nunez et al. | 709/219 |

OTHER PUBLICATIONS

Li, Sheng Feng et al. "Capturing and Indexing Computer-Based Activities with Virtual Network Computing," Proceedings of the 2000 ACM Symposium on Applied Computing, vol. 2, 2000, pp. 601-603.*

Schmidt, Brian K. et al. "The Interactive Performance of SLIM: a Stateless, Thin-Client Architecture," Proceedings of the Seventeenth ACM Symposium on Operating Systems Principles, and ACM SIGOPS Operating Systems Review, vol. 33, Issue 5, Dec. 1999, pp. 32-47.*

Chen, P. M. "When Virtual is Better than Real [Operating System Relocation to Virtual Machines]," Proceedings of the Eighth Hot Topics in Operating Systems, May 22, 2001, pp. 133-138.*

Richardson, T. "Virtual Network Computing," IEEE Internet Computing, vol. 2, Issue 1, Jan./Feb. 1998, pp. 33-38.*

Baratto, Ricardo A. et al. "THINC: A Virtual Display Architecture for Thin-Client Computing," Proceedings of the Twentieth ACM Symposium on Operating System Principles, and ACM SIGOPS Operating Systems Review, vol. 39, Issue 5, Dec. 2005, pp. 277-290.*

Yu, Yang et al. "A Feather-Weight Virtual Machine for Windows Applications," Proceedings of the $2^{nd}$ International Conference on Virtual Execution Environments, 2006, pp. 24-34.*

Garfinkel, Tal et al. "Terra: A Virtual Machine-Based Platform for Trusted Computing," Proceedings of the Nineteenth ACM Symposium on Operating Systems Principles (SOSP), and ACM SIGOPS Operating Systems Review, vol. 37, Issue 5, Dec. 2003, pp. 193-206.*

Waldspurger, Carl A. "memory Resource Management in VMWare ESX Server," Proceedings of the $5^{th}$ Symposium on Operating Systems Design and Implementation, and ACM SIGOPS Operating Systems Review, vol. 36, Issue SI, Winter 2002, pp. 181-194.*

Richardson, T. and Levine, J. "The Remote Framebuffer Protocol," RFC 6143, Mar. 2011, pp. 1-39.*

Beaty, K., et al., "Application Performance Management in Virtualized Server Environments", Management of Integrated End-to-End Communications and Services, 10th IEEE/IFIP Network Operations and Management Symposium, (NOMS 2006). Apr. 2006, 9 pages.

Chase, J., et al., "Managing Energy and Server Resources in Hosting Centers", Proceedings of the 18th ACM Symposium on Operating System Principles, Oct. 2001, 14 pages.

Kimbrel, T., et al., "Dynamic Application Placement Under Service and Memory Constraints" Proceedings of the 15th International Conference on World Wide Web, WWW 2006, May 2006, 10 pages.

Kimbrel, T., et al., "Minimizing Migrations in Fair Multiprocessor Scheduling of Persistent Tasks", Journal of Scheduling Archive, vol. 9, Issue 4, Aug. 2006, 10 pages.

Rhee, J., et al., "Deskbench: Flexible Virtual Desktop Benchmarking Toolkit", Mini-Conference. The 11th IFIP/IEEE International Symposium on Integrated Network Management (IM 2009), Jun. 2009. 8 pages.

Rolia, J., et al. "Statistical Service Assurances for Applications in Utility Grid Environments". Performance Evaluation. vol. 58, No. 1, Oct. 2004, 22 pages.

Shahabuddin, J., et al., "Stream-Packing: Resource Allocation in Web Server Farms With a QoS Guarantee", High Performance Computing—HiPC 2001, 8th International Conference, Dec. 2001, 21 pages.

Shen, K., "Integrated Resource Management for Cluster-Based Internet Services" Proceedings of the 5th USENIX Symposium on Operating Systems Design and Implementation (OSDI), Dec. 2002, 14 pages.

* cited by examiner

METHOD AND SYSTEM FOR END-TO-END QUALITY OF SERVICE IN VIRTUALIZED DESKTOP SYSTEMS

BACKGROUND

1. Technical Field

The present invention relates to providing end-to-end quality of service for a virtualized desktop environment, and more particularly to integrating a front-end and back-end of a virtualized desktop environment to achieve an objective function.

2. Description of the Related Art

Desktop virtualization is a relatively new computing approach to application delivery and management. Typically, a virtualized desktop system consists of one or more servers which run virtualization software, a plurality of end-user devices called "thin-clients", and a networking fabric which provides connectivity between the thin clients and the server(s).

Although centralized desktops provide flexibility, consolidation, and reduction in management costs, they introduce new research challenges not present in the traditional desktop model. Most prominent issues relate to how resources should be controlled and allocated on the back-end (e.g., how to implement virtual machine placement and the adjustment of shares between virtual machines), as well as to the adjustment of remoting protocol settings (e.g., the adjustment of frame rate and resolution) on the front end.

SUMMARY

In accordance with the present principles, a method is provided for implementing a virtualized desktop system. The method includes gathering network measurements related to enforcement of an objective. The method further includes determining adjustments of back-resources and front-end remoting protocol settings based on gathered network measurements and quality of service requirements for user sessions. The back-end resources and the front-end remoting protocol settings are controlled to achieve the objective.

In accordance with the present principles, a system is also provided for implementing a virtualized desktop system. The system in includes a feedback module configured to gather network measurements related to enforcement of an objective. The system further includes a controller configured to determine adjustments of back-resources and front-end remoting protocol settings based on gathered network measurements and quality of service requirements for user sessions. The controller is also configured to control the back-end resources and the front-end remoting protocol settings to achieve the objective.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a desktop virtualization environment is provided which offers an end-to-end quality of service control system. The desktop virtualization environment provides for the global enforcement of a given objective function (e.g., set of user session priorities, application business values, etc.) by controlling both a back-end allocation of resources to virtual machines and a front-end remoting protocol settings which are used to forward screen updates to thin clients. The environment should be integrated such that the front-end tuning of the remoting protocol settings is geared to achieve the same objectives as the back-end allocation of resources.

Control of the back-end resources may involve, e.g., controlling the deployment or migration of virtual machines to different servers or adjusting the shares between virtual machines. On the other hand, control of the front-end remoting protocol settings may involve, e.g., controlling the frame rate or resolution of the thin clients connected to the system. Decisions to adjust the settings on both the front-end and back-end of the system may be based on network measurements, e.g., latency or bandwidth, the business value of an application being executed, and/or a required quality of service level to be provided to particular user session(s). By controlling both of the front-end and the back-end of a desktop virtualization environment, the present principles can provide for the global enforcement of a given objective function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
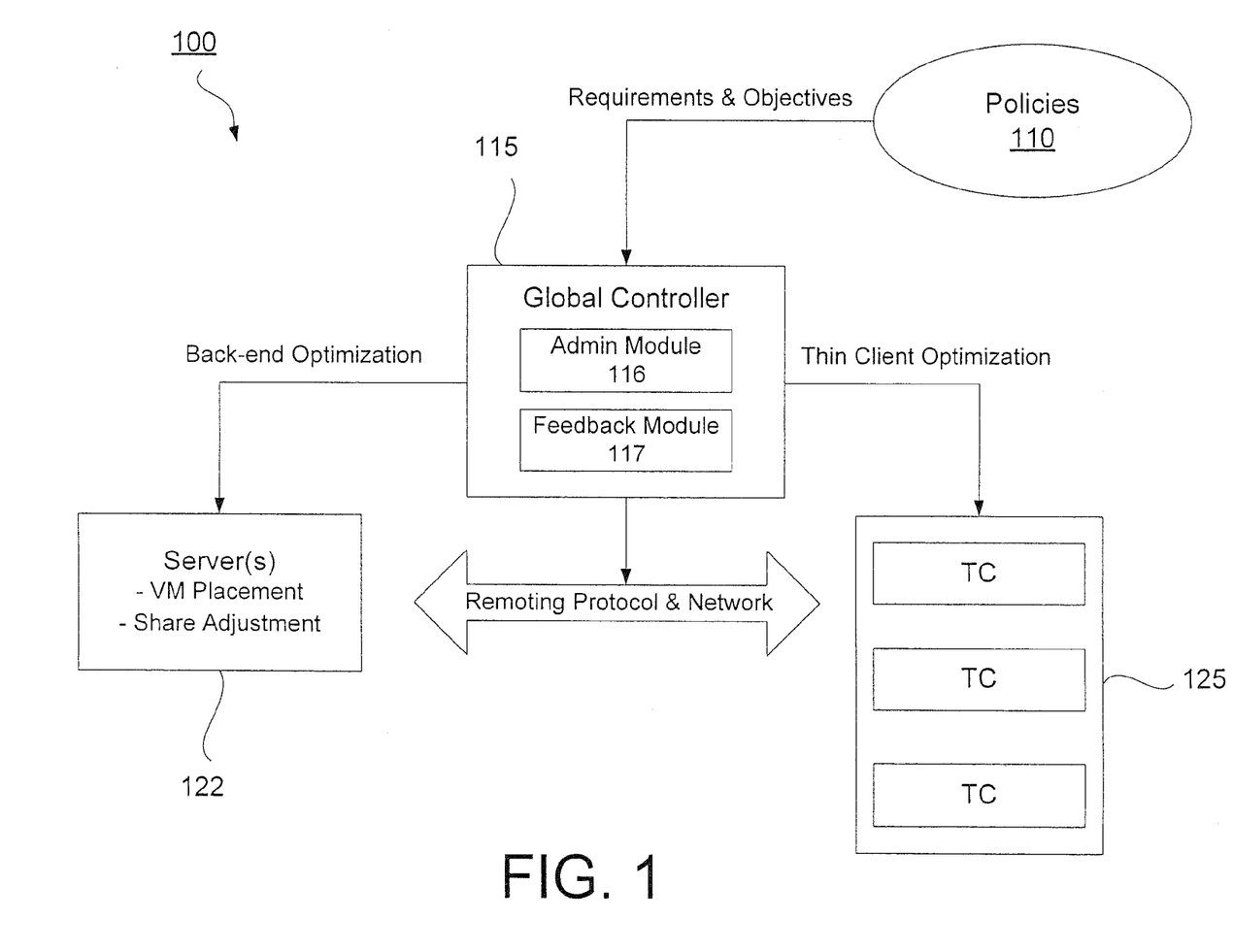
FIG. 1 is a block/flow diagram illustrating a system architecture for providing a virtualized desktop environment in accordance with one embodiment of the present principles.

Referring now in detail to the figures in which like numerals represent the same or similar elements and initially to FIG. 1, an exemplary system architecture 100 for providing a virtualized desktop environment in accordance with the present principles is illustratively shown. The system includes a policies database 110, at least one virtualization server(s) 122, a plurality of thin clients 125 and a global controller 115. Global controller 115 includes an administrator module 116 and a feedback module 117.

A virtualization server 122 or set of virtualization servers 122 provide desktop virtualization services to a plurality of thin clients 125 over a network (e.g., the Internet) using remoting protocols. These servers 122 may be located at a data center or other similar entity. A global controller 115 is in communication with both the servers 122 and the thin clients 125 and provides end-to-end quality of service for the virtualized desktop system 100 by optimizing both ends of the system as explained in further detail below. The global controller is also in communication with policies database 110.

Figure 3:
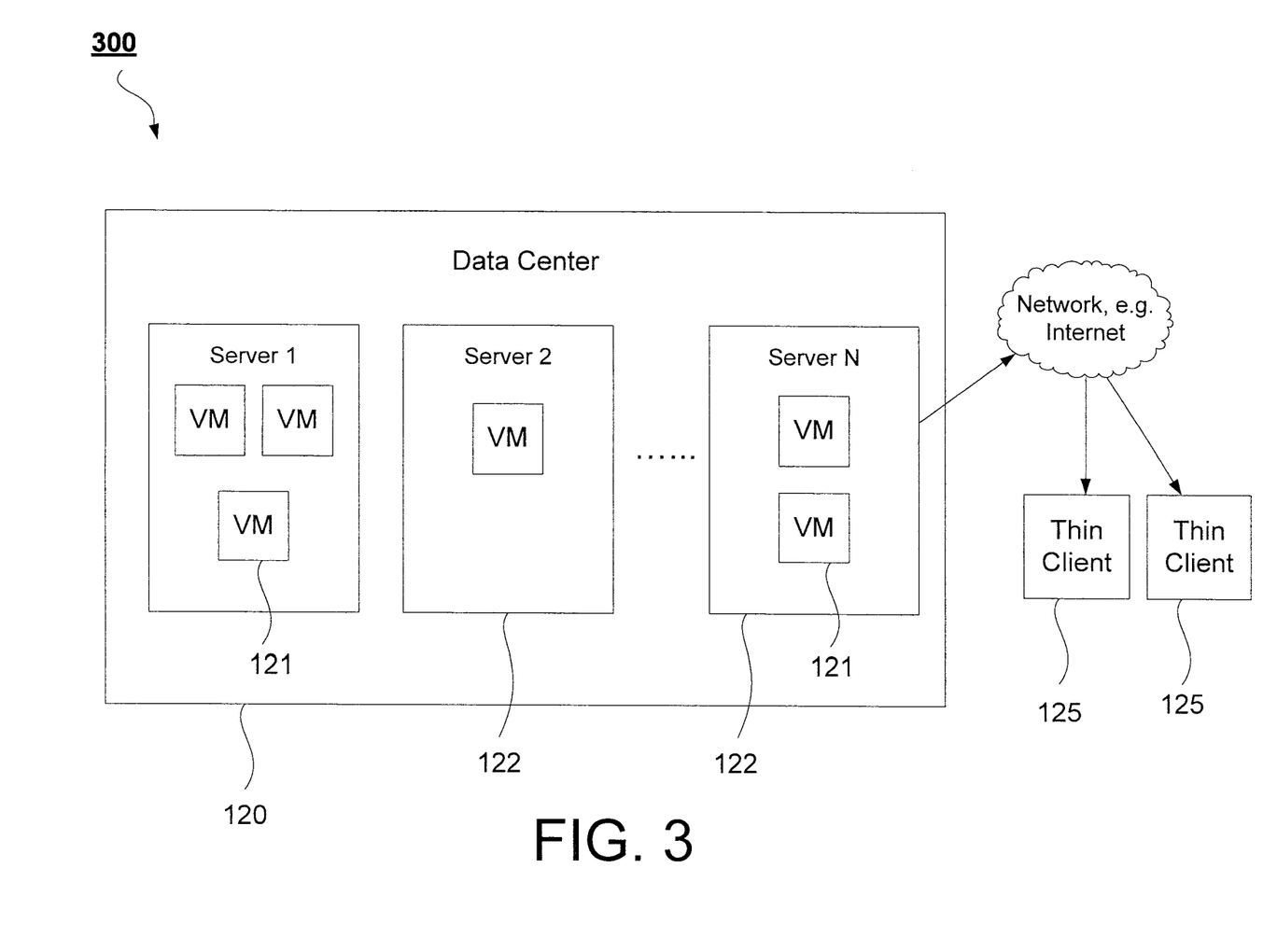
FIG. 3 is a block/flow diagram illustrating a data center that is providing desktop virtualization services to a plurality of thin clients in accordance with one embodiment of the present principles.

FIG. 3 discloses an exemplary data center configuration 300 with a plurality of virtualization servers 122. The servers 122 run desktop virtualization software to provide for a plurality of virtual machines 121. Each of the virtual machines 121 include a self-contained operating environment and behave as if they are individual separate computers. Moreover, each virtual machine 121 is connected to a thin client 125 through a network, such as the Internet, and provides a virtual desktop environment to a particular thin client 125. As illustrated in the FIG. 3, virtual machines do not have be evenly spread across the servers. A global controller 115 can assign or reassign virtual machines 121 to different servers based on quality of service requirements or based on furthering an objective function.

Servers 122 run desktop virtualization software to provide thin clients 125 with a virtualized desktop environment. For example, the execution of the desktop virtualization software at data center 120 may associate a separate virtual machine with each of the thin clients 125 to provide virtualized desktop services to each of the thin clients 125. Although data center 120 is depicted in FIG. 3 as a single entity, it should be understood that data center 120 may be multiple data centers, which may or may not be located at different geographic locations.

The policies database 110 may comprise a computer storage device or memory device which stores the objectives and requirements of the system 100 that are to be implemented by a global controller 115. For example, policies database 110 may include priority information for some or all of the user sessions, information pertaining to the business value of applications being executed, and/or the quality of service requirements which should be provided to particular user sessions.

In addition, policies database 110 may also include information relating to the responsiveness bounds of the virtual desktops. As explained in further detail below, the feedback module 117 can passively monitor, inter alia, parameters relating to the responsiveness and latency of the virtual desktop environments provided to thin clients 125. Thus, policies database 110 may include threshold or other information relating to these responsiveness and latency measures which may be used by the global controller 115 to optimize the system 100. For example, the global controller 115 may adjust the front-end and/or back-end settings depending upon the responsiveness or latency measurements derived by the feedback module 117 if these measures are above or below a certain threshold value stored in the policies database 110.

Thin clients 125 represent a plurality of end-user devices which depend upon servers 122 to provide desktop virtualization services over a network. In one embodiment, thin clients 125 utilize WYSE TCX extensions to optimize remoting features (e.g., color depth, frame rate, screen resolution, quality of audio, scrolling behavior, window movement behavior, etc.). Moreover, it should be recognized that thin clients 125 may include a number of different devices including, but not limited to, personal computers, laptops, personal digital assistants, cell phones, or other similar devices.

Global controller 115 includes an administrator module 116 which defines and enforces the requirements and objectives stored in the policies database 110 by optimizing the allocation of back-end resources to the virtual machines running on virtualization servers 122, and/or by optimizing the remoting protocol settings for the thin clients 125. For example, global controller 115 can optimize the back-end resources at the servers 122 by controlling the migration or deployment of virtual machines between different servers, or by adjusting the shares between the virtual machines. Adjusting the shares between virtual machines may involve adjusting how resources (e.g., CPU, memory, disk or network resources) are allocated to virtual machines or adjusting the limitations imposed on virtual machines with respect to using these resources.

The global controller 115 can also optimize the remoting protocol settings at the front-end of the system by adjusting the frame rate or resolution. Other front-end adjustments may also involve modifying how window moves are rendered (e.g., modifying whether a moving window is fully rendered or just the border), altering mouse moves (e.g., altering whether the mouse cursor is only local or whether the of the cursor location is forwarded to the server in fine granularity), determining whether a screen saver is displayed or other settings of the desktop environment being provided to the thin clients 125.

The global controller 115 also includes a feedback module 117 which is capable of gathering network measurements and monitoring thin clients 125. Feedback module 117 preferably monitors parameters relating to the responsiveness of the virtual desktops being provided to thin clients 125 as well as the user interactivity at the thin clients 125. In one embodiment, feedback module 117 includes a mechanism for passively monitoring desktop user activities and for measuring virtual desktop responsiveness. This may be accomplished by monitoring keyboard and mouse events as well as a frame-buffer state for the end-user devices, and measuring the response time of the users' actions. The passive monitoring method is discussed in more detail below.

In one embodiment of the system 100, one or parts of the global controller 115 may be implemented by a human administrator. For example, the global controller 115 may provide an interface which would allow a human administrator to manually optimize or adjust the both the back-end resources and the front-end remoting protocol settings. As another example, an interface can also be provided which would allow a human user to define the policies in the policies database 110.

Figure 2:
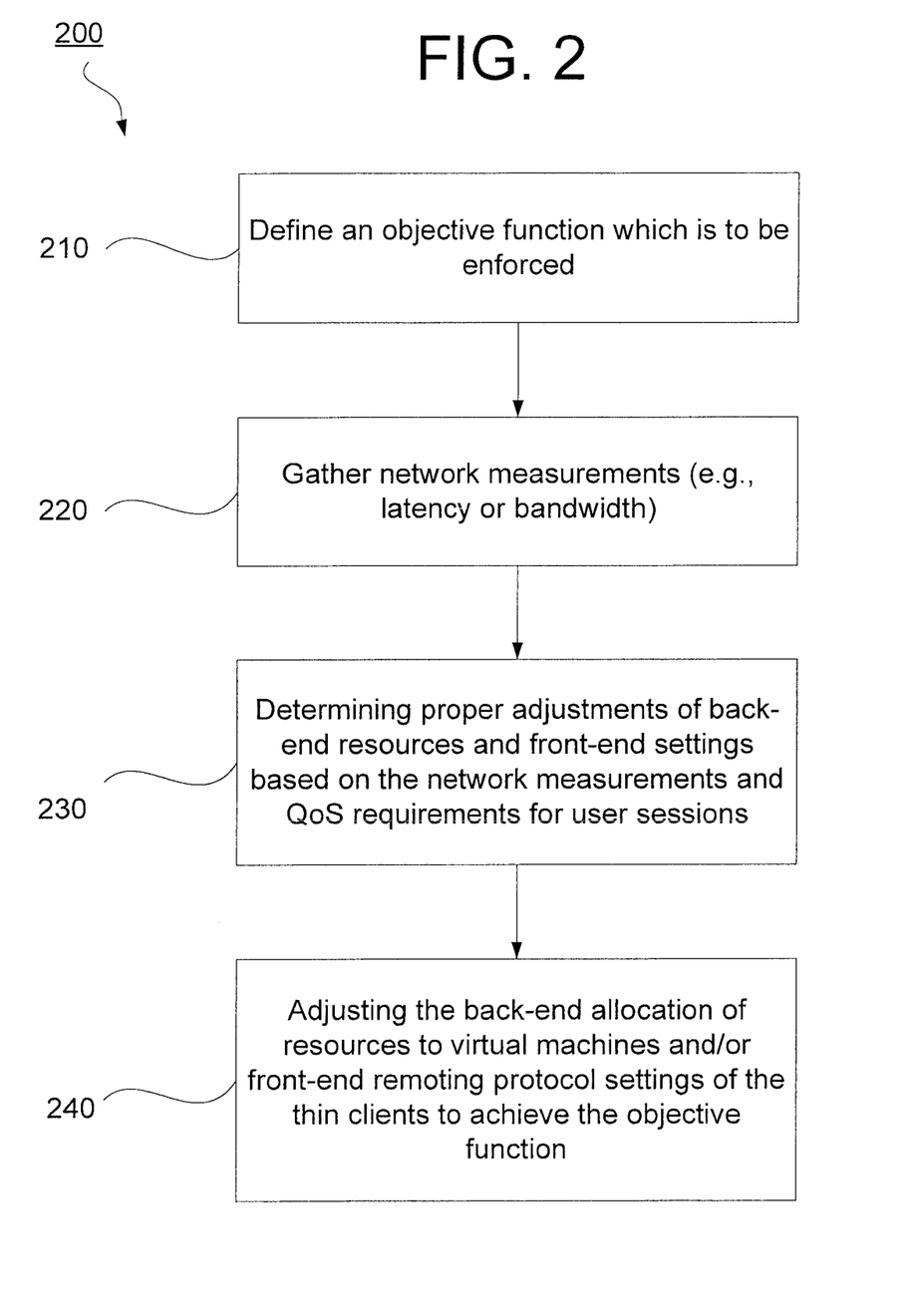
FIG. 2 is a block/flow diagram illustrating a process for providing end-to-end quality of service for a virtualized desktop environment in accordance with one embodiment of the present principles.

Referring now to FIG. 2, a block/flow diagram illustratively depicts an exemplary process 200 for providing end-to-end quality of service for a virtualized desktop environment in accordance with the present principles. In block 210, an objective function is defined which is to be enforced in a virtual desktop system, e.g., as in system 100 discussed above. As explained above, this objective function can be defined either by a controller 115 or by a human operator via an interface.

It should be recognized that an objective function can be defined to enforce nearly any goal or purpose which can be implemented in a virtual desktop environment. For example, an objective functions may be defined for enforcing a set of user session priorities, or may be based upon the business value of an application being executed. Alternatively, objective functions may also be defined based on the amount of available network resources, or to ensure that virtual desktop environments provided to thin clients 125 maintain a certain level of responsiveness.

A particularly useful objective function may relate to minimizing latency at the thin client. For example, an objective function may defined for reducing the delay experienced by the user starting when the user initiates an action (e.g., double-clicks an icon on the screen) and ending when the result of the action is rendered on the screen (e.g., a picture opens), while using no more than a certain amount of physical resources within a physical server. Another objective function may involve maximizing the frame-rate and resolution of a replayed movie without exceeding a given bound on the network bandwidth consumption and/or CPU usage on a physical server.

Next, in block 220, network measurements are ascertained by the feedback module 117 of the global controller 115. The gathering of network measurements in block 220 can be based on any network parameter or method of analyzing the data flowing through network. Preferably, the network measurements are taken to gather information which can be used to enforce the objective function. The measurements may be directed to network latency, observed bandwidth usage and packet loss rates.

In a particularly useful embodiment, network measurements are taken to monitor the responsiveness of the virtual desktops in the system. More specifically, feedback module 117 passively monitors desktop user activities and measures virtual desktop responsiveness independent of protocol and application characteristics provided to thin clients 125. This may be accomplished by monitoring specific aspects of the system, namely keyboard and mouse events and the frame-buffer state for the end-user devices, and measuring the response time of the users' actions (e.g., the time between a user double-clicks on an icon representing an application and the instant when the application window is displayed on the thin-client screen). Using this information, a precise measurement of virtual desktop responsiveness can be determined which reflects not only server latency, but also delay due to the network transfer of requests and screen updates.

The gathering of network measurements in block 220 is not limited to the passive monitoring of responsiveness information described above. For example, in other embodiments, the gathering of network measurements may involve determining the amount bandwidth which is available in the system or determining the amount of bandwidth which is being used by each thin client. Another example may involve monitoring user activity in terms of which applications are being used to determine the relative priority and business importance of each application. For example, a user executing a critical application on their desktop would get more resources than the user browsing the Internet.

The network measurements taken in block 220 are used in conjunction with the quality of service requirements in block 230 to determine how the back-end resources and front-end remoting protocol settings should be adjusted to achieve the defined objective function. Ascertaining how to make adjustments may involve initially determining whether both ends of the system should be adjusted, or whether only one of the back-end resources and front-end settings should be adjusted. For example, in certain cases a simple adjustment of one end of the system may be sufficient to achieve the objective function without having to alter the end. However, in other cases, it may be appropriate to make adjustments on both ends of the system to ensure that the objective function is achieved. In the case where adjustments are to be made to both the back-end and the front-end of the system, it should be further determined how to properly balance the adjustments to both ends of the system. This may be done, at least in part, using quality of service requirement information and/or the measurements taken in block 220.

In block 240, adjustments are made to either the front-end, back-end or both ends of the system in such a manner that achieves the objective function defined in block 210. The optimization of back-end resources may involve determining how the virtual machines running at data center 120 are initially deployed (i.e., determining which server will run a new virtual machine). This may also involve controlling the migration of virtual machines to different servers. For example, if it is determined that a virtual machine being executed on a server requires additional back-end resources (e.g., processing power, memory allocation, etc.) than are currently available on the server in order to achieve an objective function, global controller 115 may choose to allocate the execution of the virtual machine to a server which has more available resources.

In addition, the optimization of back-end resources may involve adjusting the shares between virtual machines. For example, the system can increase the number of CPU shares allocated to a virtual machine running a desktop for a user who is currently using a critical business application while reducing the number of CPU shares allocated to another virtual machine which is currently running a non-critical application. As another example, a bigger fraction of available network bandwidth may be allocated to a user running a critical application while reducing network bandwidth's share of a user running a non-critical application. Even further, similar share differentiation may be based on whether a user session is interactive (e.g., executing an interactive application such as word editor) or non-interactive (e.g., executing a batch application, such as a virus scan).

As mentioned above, the measurements taken in block 210 can also be used to optimize the front-end of the desktop virtualization system. Optimizing the front-end may involve controlling the front-end remoting protocol settings, e.g., controlling the frame rate, resolution, screen compression parameters, etc. of the desktop environment being provided to thin clients connected to the system.

In one particularly useful embodiment, the global controller 115 or human operator can use a series of "tunable parameters" to adjust the performance on the front-end of the system. For example, these tunable parameters would allow a user to modify the rendering of desktop wallpaper, whether a moving window is rendered in its entirety or just the border, whether mouse events are reflected on a server with fine granularity, scrolling behavior (e.g., how smooth the screen refreshes while scrolling), screen compression parameters, frame rate or resolution.

Some examples how the present invention can adjust both the front-end and back-end of the system to achieve an objective function will now be provided to further illustrate the present principles.

As a first example, an objective function may be defined to ensure that a minimum level of quality of service is provided to all thin clients 125. To accomplish this, feedback module 117 may monitor the responsiveness of the virtual desktops provided to thin clients 125. It may be determined that the responsiveness of one or more of the thin clients is below the desired quality of service, e.g., by comparing responsiveness parameters to threshold values stored in the policies database 110. When feedback module 117 detects that a sub-standard quality of service is being provided to one or more of the thin clients 125, the global controller 115 may determine the best course of action to take to remedy the problem and ensure that the minimum quality of service level is provided to the thin client. For example, global controller 115 may determine whether it would be better to adjust the back-end resources, the front-end remoting parameters or a combination of both in order to rectify the problem. Then the administrator module 116 of the global controller can implement the necessary adjustments and enforce the defined objective function.

As another example, when the objective function is defined to give a specific user session(s) priority over all other sessions or defined to enforce a set of session priorities, a user session or set of sessions could be allocated additional back-end resources and/or be given a higher frame rate or resolution than other user sessions. This may involve migrating the virtual machine associated with a user session to a separate server with more available resources or dedicating a server entirely to the execution of the virtual machine.

Even further, in the case where an objective function is defined to optimize a specific application being executed by one of the thin clients which is deemed be particularly valuable in a business sense, the global controller 115 can ensure that more resources are allocated to the processing associated with the application (e.g., if the application requires a high processing capacity) than are allocated to other thin clients 125 which are not executing the particular application, and/or optimize the frame rate or resolution which is provided to the thin client 125 running the application (e.g., if the application involves streaming large amounts of data).

Moreover, although the discussion above in part describes the enforcement of an objective function as relating to the enforcement of a single policy, it should be understood that the enforcement of an objective function may relate to the simultaneous enforcement of multiple objectives. For example, an objective function may be defined to enforce both a set of user priorities and to ensure that a minimum level of quality of service is maintained at each of the thin clients 125. As another example, an objective function may also be defined which is based on both the business value of an application and the amount of available network resources.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   gathering network measurements related to enforcement of an objective, said objective being stored on a computer readable storage medium;
   determining adjustments of back-resources and a plurality of types of front-end remoting protocol settings based on gathered network measurements and quality of service requirements for user sessions; and
   controlling the back-end resources and the front-end remoting protocol settings using a global controller to achieve the objective, wherein the global controller is in communication with both servers and clients.

2. The method of claim 1, wherein adjusting the back-end resources involves controlling migration or deployment of virtual machines between different servers or adjusting shares between virtual machines.

3. The method of claim 1, wherein adjusting the front-end remoting protocol settings involves controlling the frame rate or resolution of at least one thin client coupled to the desktop virtualization environment.

4. The method of claim 1, wherein determining adjustments of back-resources and front-end remoting protocol settings involves concurrently determining whether both ends of the environment should be adjusted, or whether only one of the back-end resources and front-end remoting protocol settings should be adjusted.

5. The method of claim 1, wherein gathering network measurements involves passively monitoring at least one thin client coupled to the desktop virtualization environment by measuring virtual desktop responsiveness and monitoring user activities at the at least one thin client.

6. The method of claim 5, wherein passively monitoring at least one thin client involves monitoring keyboard events, mouse events and a frame-buffer state for the at least one thin client, and using these parameters to measure virtual desktop responsiveness at the at least one thin client.

7. The method of claim 1, wherein the objective is based on a set of user session priorities or a business value of an application being executed.

8. The method of claim 1, wherein the objective is defined by a human operator via a user interface which is provided by a global controller.

9. A system, comprising:
   a feedback module configured to gather network measurements related to enforcement of an objective, said objective being stored on a computer readable storage medium; and
   a controller configured to determine adjustments of back-resources and a plurality of types of front-end remoting protocol settings based on gathered network measurements and quality of service requirements for user sessions, and further configured to control the back-end resources and the front-end remoting protocol settings using a global controller to achieve the objective, wherein the global controller is in communication with both servers and clients.

10. The system of claim 9, wherein the controller adjusts the back-end resources by controlling migration or deployment of virtual machines between different servers or by adjusting shares between virtual machines.

11. The system of claim 9, wherein the controller adjusts the front-end remoting protocol settings by controlling the frame rate or resolution of at least one thin client coupled to the desktop virtualization environment.

12. The system of claim 9, wherein determining adjustments of back-resources and front-end remoting protocol settings involves concurrently determining whether both ends of the environment should be adjusted, or whether only one of the back-end resources and front-end remoting protocol settings should be adjusted.

13. The system of claim 9, wherein the feedback module passively monitors at least one thin client coupled to the desktop virtualization environment by measuring virtual desktop responsiveness and monitoring user activities at least one thin client.

14. The system of claim 13, the feedback modules monitors keyboard events, mouse events and a frame-buffer state at the at least one thin client, and uses these parameters to measure virtual desktop responsiveness at the at least one thin client.

15. The system of claim 9, wherein the objective is based on a set of user session priorities or the business value of an application being executed.

16. The system of claim 9, wherein the objective is defined by a human operator through a user interface.

17. A computer program product comprising a computer readable storage medium having a computer readable program, wherein the computer readable program when executed on a computer causes the computer to:
   gather network measurements related to enforcement of an objective;
   determine adjustments of back-resources and a plurality of types of front-end remoting protocol settings based on gathered network measurements and quality of service requirements for user sessions; and
   adjust the back-end resources and the front-end remoting protocol settings using a global controller to achieve the objective, wherein the global controller is in communication with both servers and clients.

18. The computer program product of claim 17, wherein adjusting the back-end resources involves controlling migration or deployment of virtual machines between different servers or adjusting shares between virtual machines.

19. The computer program product of claim 17, wherein adjusting the front-end remoting protocol settings involves controlling the frame rate or resolution of at least one thin client coupled to the desktop virtualization environment.

20. The computer program product of claim 17, wherein determining adjustments of back-resources and front-end remoting protocol settings involves concurrently determining whether both ends of the environment should be adjusted, or whether only one of the back-end resources and front-end remoting protocol settings should be adjusted.

21. The computer program product of claim 17, wherein gathering network measurements involves passively monitoring at least one thin client coupled to the desktop virtualization environment by measuring virtual desktop responsiveness and monitoring user activities at the at least one thin client.

22. The computer program product of claim 21, wherein passively monitoring at least one thin client involves monitoring keyboard events, mouse events and a frame-buffer state for the at least one thin client, and using these parameters to measure virtual desktop responsiveness at the at least one thin client.

23. The computer program product of claim 17, wherein the objective is based on a set of user session priorities or the business value of an application being executed.

24. The computer program product of claim 17, wherein the objective is defined by a human operator through a user interface.

* * * * *